(12) United States Patent
Knutson

(10) Patent No.: US 6,632,151 B1
(45) Date of Patent: Oct. 14, 2003

(54) POWER TRANSMISSION BELT WITH TUBULAR KNIT OVERCORD

(75) Inventor: Paul S. Knutson, Aurora, CO (US)

(73) Assignee: The Gates Corporation, Denver, CO (US)

(*) Notice: Subject to any disclaimer, the term of this patent is extended or adjusted under 35 U.S.C. 154(b) by 1 day.

(21) Appl. No.: 09/709,696

(22) Filed: Nov. 9, 2000

Related U.S. Application Data

(60) Provisional application No. 60/165,381, filed on Nov. 12, 1999, and provisional application No. 60/206,102, filed on May 20, 2000.

(51) Int. Cl.⁷ .............................. F16G 1/04; F16G 5/08
(52) U.S. Cl. ..................... 474/266; 474/260; 474/267; 156/137; 156/139
(58) Field of Search ................. 474/260, 263, 474/250, 237, 265, 266–268, 238, 262; 156/137, 138, 277, 139, 528, 533, 227

(56) References Cited

U.S. PATENT DOCUMENTS

| | | | | |
|---|---|---|---|---|
| 3,564,933 A | * | 2/1971 | Clinkenbeard | 156/138 |
| 3,853,017 A | * | 12/1974 | White et al. | 474/267 |
| 3,981,206 A | | 9/1976 | Miranti, Jr. et al. | 474/238 |
| 3,996,813 A | * | 12/1976 | Henderson et al. | 474/238 |
| 4,011,766 A | * | 3/1977 | Waugh | 474/205 |
| 4,449,959 A | * | 5/1984 | Matsumura | 474/250 |
| 4,551,120 A | | 11/1985 | Thomey | |
| 5,387,160 A | * | 2/1995 | Nakajima et al. | 474/271 |
| 5,427,728 A | | 6/1995 | Beck et al. | |
| 5,645,504 A | | 7/1997 | Westhoff | |
| 5,714,024 A | * | 2/1998 | Tomiyama et al. | 156/137 |
| 5,843,258 A | * | 12/1998 | Murakami | 156/137 |
| 5,858,147 A | * | 1/1999 | Goettsch | 474/262 |
| 5,938,552 A | | 8/1999 | Serkh | |
| 6,103,349 A | * | 8/2000 | Matsumoto | 474/265 |

FOREIGN PATENT DOCUMENTS

| | | |
|---|---|---|
| DE | 12 53 907 | 11/1967 |
| EP | 0 321 276 | 6/1989 |
| EP | 0 492 960 | 7/1992 |
| EP | 0 714 757 | 6/1996 |
| EP | 0 763 614 | 3/1997 |
| EP | 0 699 506 | 3/1999 |
| EP | 0 742 383 | 3/2000 |
| JP | 7-243483 | 9/1995 |
| WO | WO 98/58794 | 12/1998 |

* cited by examiner

Primary Examiner—Marcus Charles
(74) Attorney, Agent, or Firm—C. H. Castleman, Esq.; S. G. Austin, Esq.; J. A. Thurnau, Esq.

(57) ABSTRACT

A power transmission belt is disclosed in which the exterior of the overcord section is generally flat in contour and bears an outer seamless tubular knit textile material adhered to an adjacent rubber layer material interposed between the exterior belt back surface and a strain-resisting tensile section. The belt is adapted to be run against backside idlers or tensioners with minimized noise generation. A simplified process including use of a tubular knit stretched over and applied to the building drum is disclosed, thereby eliminating conventional calendaring and Bannering operations.

4 Claims, 3 Drawing Sheets

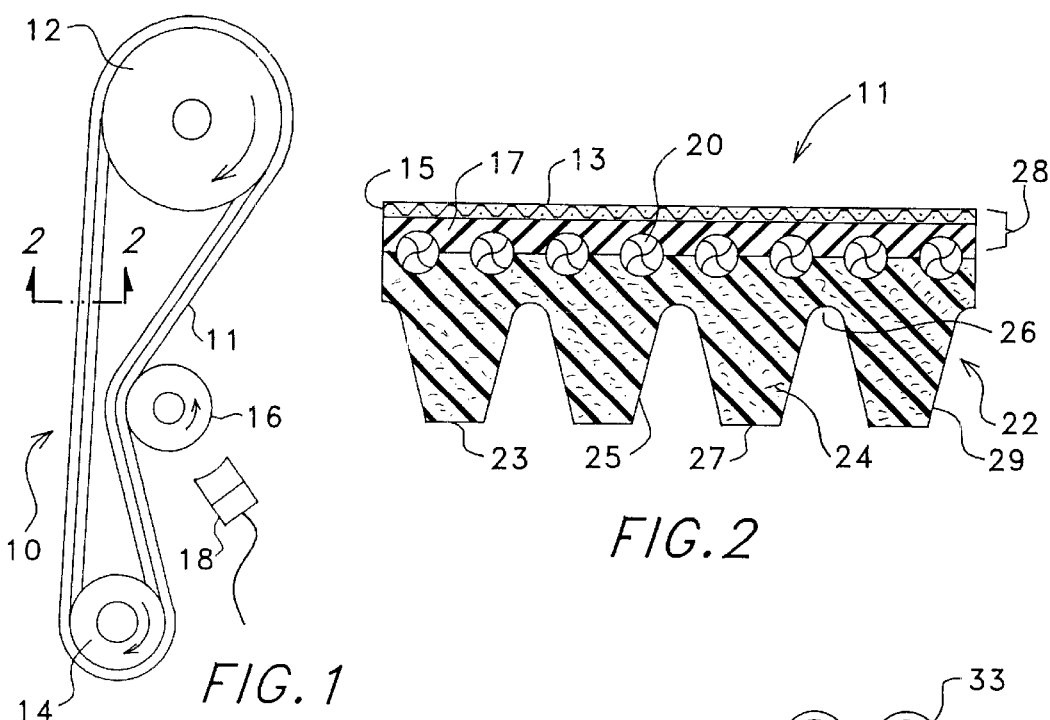
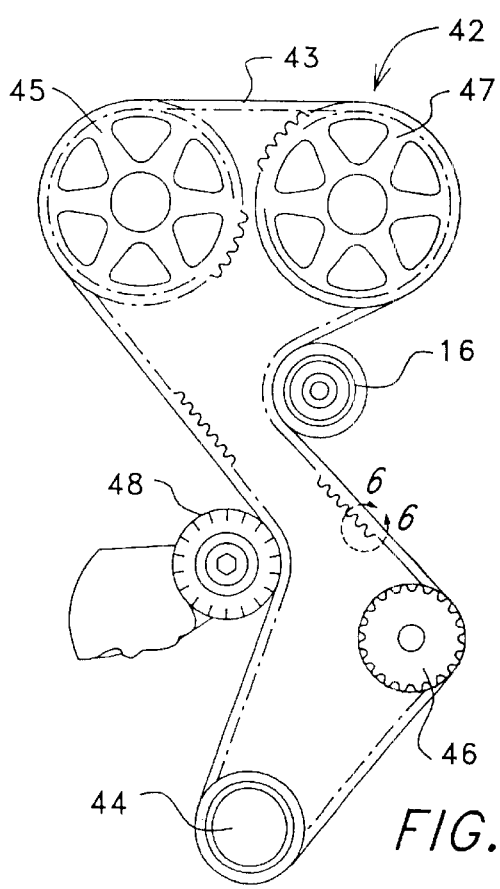
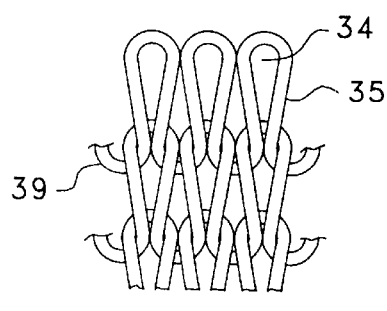
FIG. 1
FIG. 2
FIG. 3
FIG. 4
FIG. 5

POWER TRANSMISSION BELT WITH TUBULAR KNIT OVERCORD

CROSS REFERENCE TO RELATED APPLICATIONS

This nonprovisional application claims the benefit of U.S. Provisional Application No. 60/165,381 filed Nov. 12, 1999 and No. 60/206,102 filed May 20, 2000.

BACKGROUND OF THE INVENTION

1. Field of the Invention

This invention relates to power transmission belts of the rubber type, particularly a belt whose back surface is adapted to make contact with an idler pulley, tensioner or other device tending to generate noise at the interface of such device with the belt.

2. Description of the Related Art

Modern front end accessory drive systems for automobiles use serpentine multi-V-ribbed belts to link the engine crankshaft with various accessory driven pulleys. The backside of the belt typically impinges against backside idler pulleys and/or tensioning devices. Similarly, camshaft belt drive systems for automotive application systems use synchronous power transmission belts, the backsides of which are also trained about idler pulleys and/or tensioners. In addition, in many industrial belt drive applications, the drives include idlers or other devices against which the back of a multi-V-ribbed belt, synchronous belt, flat belt, V-belt or the like engages. In all of the foregoing automotive and industrial applications, chirping or "thumping" noise may be generated at the interface of the backside of the belt and drive device. The noise levels are often times unacceptable to the manufacturer or user.

For instance, overcords of belts of the multi-V-ribbed type typically employ a crosscord, or a bias laid fabric in which warp and weft yarns are oriented diagonally in respect to the longitudinal running direction of the belt, with an included angle between the yarns of about 90–120 degrees. These textile overcord reinforcements provide lateral stability, assist release of the belt slab from its mandrel during the manufacturing process, and allow tailoring the coefficient of friction on the backside of the belt. Typically these belts' overcord textile materials are calendared with gum rubber into the interstices (and on the faces) of the fabric and then the frictioned fabric/gum assembly is cut and respliced (using a Banner table-trademark) to provide the correct fabric cord orientation. This fabric cord orientation provides maximum or optimal lateral strength while allowing high flexibility in the longitudinal direction of the belt.

To effectively use these types of textile composite materials in the belt overcord, most manufacturing processes require making overlapping splices to reconnect the material after "Bannering", as well as during the belt building process. These overlap splice joints create double thickness areas which have been found to cause noise and vibration in automotive serpentine drives. As the belt rotates around the drive, these splices contact the backside idlers, tensioners and the like which can cause the belt to chirp and the belt and drive components to vibrate.

With synchronous belt products it is common practice to use textile jackets which are made of stretch type fabrics, which are treated for adhesion, cut to length to match a particular belt length, and sewn or ultrasonically stitched back together to form a cylindrical tube or jacket for application to the belt teeth as a facing, or in the overcord. The resulting seams can serve as noise generators, and the overall process is time consuming and expensive.

The foregoing belt types also typically bear on their exterior belt back surface a label to identify the belt. A typical labeling process involves applying a polymeric film e.g. Mylar (Du Pont trademark) polyester, or other substrate transfer label against the belt sleeve in the course of its vulcanization. The Mylar label embeds into the outer rubber surface of the belt, and then the Mylar backing is stripped from the sleeve after conclusion of vulcanization, leaving a negative imprint, i.e. ridges or steps in the belt back surface which serve as additional noise generator sites.

The use of knit overcord fabrics, per se, is known from U.S. Pat. No. 3,981,206 (Miranti et al). However, in the belt construction of Miranti et al, the belt is built up on a cylindrical drum by applying various layers of material wrapped therearound, including the outer (nontubular) knit fabric. Such wrapping process will produce a seam or lapped joint, which will serve as a noise generator in backside idler and tensioner drives.

Seamless knitted tubular fabrics have also been used in the overcord of power transmission belts of the liquid cast (polyurethane) type. Unexamined Japanese patent application no. 7-243 483 (Bridgestone), published Sep. 19, 1995, discloses a multi-V-ribbed belt in which the tubular knit in the overcord is positioned directly against the tensile cord prior to liquid casting. The tensile cord and tubular knit make direct contact in the final fabricated liquid cast belt.

It is an object of this invention to overcome drawbacks in the prior art by providing a rubber power transmission belt utilizing a textile-reinforced overcord section which imparts lateral stability to the belt while allowing high flexibility in the running direction of the belt, and is characterized by an overcord free of joints, lapped splices or seams which would generate noise in belt drives using backside idlers, tensioners or the like.

It is a further object to achieve the foregoing without the need to Banner, calendar or otherwise prepare the outside jacket for the overcord of the belt, thus eliminating process steps and cost.

SUMMARY OF THE INVENTION

These and other objects of the invention are met by a power transmission belt which includes a rubber body, a strain-resisting tensile member embedded in the body, an overcord section terminating in a generally flat exterior belt back surface, and an undercord section, in which a seamless tubular radially stretchable textile material, preferably a seamless tubular knit textile material, is positioned at the exterior back belt surface, and a rubber layer is adhered to the tubular knit textile material on its undersurface and is interposed between the tubular knit textile material and the strain-resisting member.

In another aspect, the power transmission belt of the invention is manufactured by a method including the steps of applying a seamless tubular radially stretchable, preferably knit, textile material about the exterior surface of a belt building drum, wrapping a rubber layer serving as an adhesion gum layer over the seamless tubular textile material, helically winding strain-resisting tensile cord members about the rubber layer, applying a further rubber layer over the exterior of the helically wound tensile cord, and subjecting the belt sleeve comprised of the tubular textile material, first rubber layer, strain-resisting textile cord helically wound about the first rubber layer, and second rubber layer, to heat and pressure to form a vulcanized belt sleeve from which individual belts can be severed.

BRIEF DESCRIPTION OF THE DRAWINGS

Preferred aspects of this invention will be described with reference to the accompanying drawings, in which like numerals designate like parts in the several figures, and wherein:

FIG. 1 is a simplified engine accessory drive system;

FIG. 2 is a transverse cross section of a multi-V-ribbed belt used in the accessory drive system of FIG. 1 taken along 2—2;

FIG. 3 is a partial plan view of a ribbed knit fabric usable in the overcord section of the belt of the invention;

FIG. 4 is a plan view of the technical face of a jersey knit construction usable in the belt of the invention;

FIG. 5 is a front view schematic of a synchronous (timing) belt drive system of the automotive type which includes a tensioner and a backside idler pulley impressed against the backside of the belt of the invention;

DESCRIPTION OF PREFERRED EMBODIMENT

Figure 6:
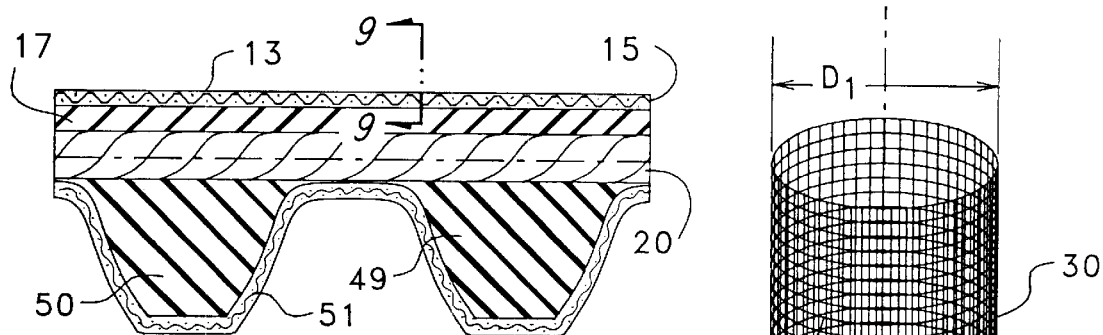
FIG. 6 is an expanded side elevational view of a synchronous belt used in the belt drive system of FIG. 5.

Referring first to FIGS. 1 and 2 of the drawings, an engine accessory drive system is shown generally at 10, consisting of an engine crankshaft pulley 14, and a driven pulley 12 linked in driving relationship by a four-ribbed serpentine belt 11. The top or exterior back surface 13 of belt 11 makes contact with idler pulley 16. The drive system 10 of FIG. 1 may be used as a simple automotive accessory drive system, an industrial drive, or a test apparatus for measuring noise generated at the interface between belt 11 and backside idler pulley 16 through sensor/transducer 18 (measuring dB's (decibels) and noise characteristics). The particular application and type of drive system will be dictated by the type of belt configuration chosen. Generally the principles of the invention may be applied to V-belts, flat belts, multi-V-ribbed belts and synchronous belts. An example of a common automotive front end accessory drive system in which the belt of the invention may be used is illustrated and disclosed in U.S. Pat. No. 4,551,120, which consists of a main driving pulley operatively connected to an air conditioning motor pulley, an alternator pulley, an engine air pump pulley, and a water pump pulley. The multi-V-ribbed belt trained about these pulleys is kept in appropriate tension through a tensioner having a surface engaging the backside of the belt.

The belt of FIG. 2 is formed of a rubber body. By "rubber" is meant a cross-linkable natural or synthetic rubber which is processable in solid form, e.g. on a mixing mill. Such rubber is typically mixed in a green or unvulcanized form with appropriate additives, extenders, reinforcements, accelerators, fillers, vulcanizing agents, e.g. sulfur and peroxides, and the like in a Banbury® mixer, or continuous mixer, well known in the rubber processing industry. Layers or calendared sheets of stock are then ready to be built up in layered form with textile reinforcement and the like, the green reinforced rubber in sleeve or other form is vulcanized or cured under heat and pressure. If cured in sleeve form, individual belts may be cut from the sleeve. Typical synthetic rubbers useful in the invention include polychloroprene, copolymers of ethylene and propylene, terpolymers of ethylene, propylene and diene monomers, e.g. EPDM, styrene butadiene rubber, HNBR, CSM, silicone rubber, fluoroelastomers, mixtures of the foregoing, and alloys or mixtures of the foregoing or other known solid-processable rubbers mixed with suitable thermoplastic or thermosetting polymers or "plastomers", polyethylene, polyester (Hytrel trademark) or materials such as Santoprene (Monsanto trademark). Liquid processable elastomeric materials such as those formed by liquid casting, applicable to many forms of polyurethane, are not within this definition and are not contemplated by the invention.

The belt of FIG. 2 is a four-ribbed serpentine belt employing a strain-resisting tensile member 20 which is embedded in the rubber body of the belt. It is positioned by helically winding it as will be discussed further in respect to the building process described with reference to FIG. 7. The tensile cord members may be any typical strain-resisting cord or members formed of Nylon, polyester, carbon, aramid e.g. KEVLAR®, or TWARON® fibers (both trademarks) and the like, and are typically formed of twisted yarns. The yarns, in turn, are usually composed of many fibers. The cords may be sized or treated e.g. with RFL (resorcinol formaldehyde latex), to enhance adhesion to the rubber. The undercord or compression section 22 of the belt may be formed of an unloaded rubber stock, however typically it is formed of a suitable rubber in which has been mixed loading of discrete reinforcement fibers 24 of desired material such as cotton, polyester or aramid. The multiple ribs of the undercord section shown at 23, 25, 27, 29 may be formed by grinding away the fiber loaded rubber between adjacent ribs, up to the apex 26 between adjacent ribs, or by molding, fly cutting or other technique. The shape and configuration of the ribs is normally substantially matched to the corresponding shape of the pulleys 12 and 14 about which the belt is linked in driving relationship.

The overcord section of the belt shown at 28 includes a generally flat exterior belt back surface 13, a seamless tubular radially stretchable, preferably knit, textile overcord material 15 positioned at the exterior belt back surface, and an interposed rubber layer such as adhesion gum layer 17 which is selected to adhere to the tubular knit textile material 15 as well as the adjoining cords 20. The adhesion gum layer 17 may be formed of the same or similar (compatible) rubber material as utilized in the undercord section 22 to ensure proper adhesion and integration into the composite belt structure.

Figure 8:
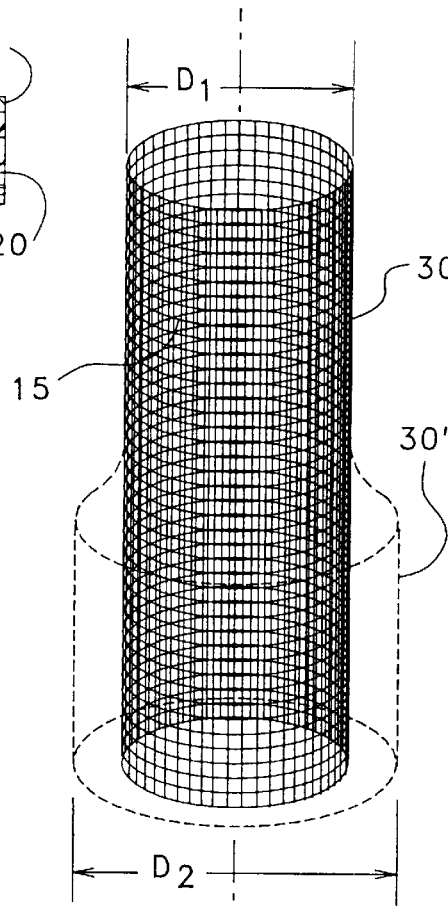
FIG. 8 illustrates a seamless tubular knit textile material of the invention in its rest position, as well as partially expanded as shown in phantom.

The radially stretchable, preferably knit material 15 is in the form of a seamless tube, such as shown at 30 in FIG. 8 of a rest diameter of $D_1$ which, because of inherent stretchability of up to 500% or more typically, may be expanded (at 30') to an increased diameter $D_2$ as shown in phantom. The normal diameter $D_1$ should be chosen to be equal to or preferably somewhat less than the diameter of the building drum or mandrel, with the rest diameter $D_1$ of the tubular knit textile material being preferably from about 20 to 100 and more preferably from about 30 to about 80 percent of the final diameter of the knit tube as applied in stretched condition on the building drum, shown at 31 in FIG. 7. In general, the degree of expansion, and the corresponding opening size of interstices 33, 34 (FIGS. 3 and 4) of the tubular knit material, and its construction (e.g. denier, fiber type and twist, and density of courses and wales) can be selected to obtain a resultant belt surface with a coefficient of friction selected for optimal belt performance for the application.

Knit tube 30 (FIG. 8) is produced in a seamless tube form, i.e. the circular knitting process inherently produces a tube of a particular diameter $D_1$ depending on the preselected equipment components utilized in the knitting machine. The individual yarns may be formed of monofilaments or multiple filaments but typically are formed of bundles of twisted staple fibers of any suitable material such as cotton, polyester, Nylon, aramid, carbon or mixtures thereof. Alternatively, the yarns may be comprised of individual elastic core filaments covered with a staple or texturized textile sheath. The yarns may be sized or coated for enhanced adhesion e.g. with RFL or a compatible rubber dissolved in an organic solvent. It is contemplated that tubes 30 of a given diameter may be useful for more than one belt size given the significant stretchability of the knit tube itself. Different knit patterns may be employed, such as the rib-knit configuration shown in FIG. 3 in which the wales or vertical rows 35 of stitches of yarns 39 intermesh alternately on the face and the back of the knit. Rib-knit fabrics of this type have good elasticity, especially in the width direction. A jersey knit as shown in FIG. 4, formed of a circular knit fabric made with a plain stitch is currently the most preferred knit fabric for use with the invention. It is preferred that the technical face, as shown in FIG. 4, faces inwardly (toward the adhesion gum layer 17.) As with the rib-knit of FIG. 3, the wales or rows extend vertically in the figures, as well as vertically in the tube of FIG. 8. Such orientation, when applied to the belts of FIG. 2 and FIG. 6, for instance, will cause the wales or vertical rows of stitches to be oriented transversely to the longitudinal (running) direction of the completed belt. Other knit or radially stretchable configurations which can be formed into a seamless tubular configuration with openings (interstices) allowing rubber flow through are also contemplated.

In the completed belt, the interstices 33, 34 of the knit fabric will be largely filled with rubber material supplied by the adhesion gum layer 17. In the most preferred form as shown schematically in FIG. 9, rubber from adhesion gum layer 17 will fill the bulk of the interstices 34 of the seamless tubular knit textile material, but the yarns tips 36, 38, 40 which form the outermost exterior surface 13 of the top of the belt, and the fibers of the yarns which are positioned at such belt back surface, will be free from full encapsulation by the rubber of the rubber body. That is, yarn tips 36, 38, 40 and associated fibers will be unencapsulated and present at the generally flat exterior belt back surface for engagement, along with the exposed rubber layer within the knit interstices, with a tensioner, backside pulley or the like. Where an increased belt backside coefficient of friction is needed to prevent slippage with an associated driven pulley or the like, it is preferred to increase the interstice opening 34 (e.g. by increasing the ratio $D_2:D_1$).

Alternatively, although less preferred, as long as the tubular knit textile material is in a seamless, cylindrical form, and adhesion rubber layer 17 is interposed between the tensile cord 20 and the back surface of the belt, an outermost rubber layer (not shown) may fully encapsulate the knit fabric and embed the same in rubber and still benefit from low noise generation and other advantages of the invention.

In this embodiment an extra layer of rubber may be interposed between the building drum 31 and knit tube 30, preferably butt spliced to avoid an overlap splice.

In FIGS. 5 and 6, a synchronous or "timing" belt drive system 42 is shown and includes a toothed or synchronous belt 43 trained and tensioned around a crank pulley 44, an idler pulley 16, and a water pump pulley 46, camshaft pulleys 45, 47 and a tensioner or tensioning pulley 48. The tensioner may be of various types including the torsion spring arm type disclosed in U.S. Pat. No. 5,938,552 to Serkh.

Figure 9:
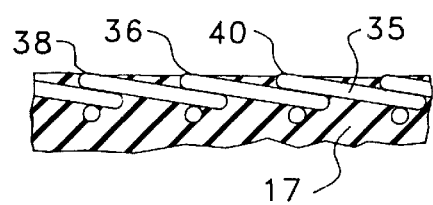
FIG. 9 is a partial sectional view of the overcord section of the belt of FIG. 6 of the invention at 9—9.

Referring to FIG. 6, belt 43 is formed of a rubber body 49 in which is embedded a strain-resistant tensile cord 20. A series of cogs or teeth 50 are disposed on the underside of the belt adapted to mesh with the sprocket teeth of camshaft sprockets 45, 47, crankshaft 44 and water pump pulley 46, in gear-like fashion to transmit power in synchronization. Belt 43, similarly to multi-V-ribbed belt 11 discussed in respect to FIG. 2, employs a seamless tubular knit textile material 15 at the exterior back surface 13 of the belt. A layer 17 of rubber of adhesion gum type is interposed between cord 20 and the exterior belt surface 13, and during processing a portion of the rubber extrudes through the interstices 33, 34 of the seamless tubular knit textile material 15, but preferably does not fully encapsulate all of the knit material, leaving protruding yarn segments 36, 38, 40 on the exterior, as shown in FIG. 9. Alternatively, but less preferably, the knit exterior may bear a layer, preferably thin (for example of 0.002 inches (0.051 mm) to 0.020 inches (0.508 mm) thick, more preferably 0.003 inches (0.076 mm) to 0.007 inches (0.178 mm) thick, with its ends butt spliced together), of rubber or other suitable friction-engineered material at the outer surface 13 of the belt.

The belt teeth 50 may, in customary fashion, carry an outer abrasion resistant toothed fabric layer 51 adhered to the rubber of the teeth. Typical suitable materials include a stretch nylon square woven fabric material or knit material. The teeth 50 may also include transverse stiffening elements or other reinforcements not shown.

A method of forming the belt of FIG. 2 will be discussed in relation to the apparatus of FIG. 7. On to a building drum 31 is first applied, optionally, an elongated transfer label 51 upon which is imprinted any desired indicia, e.g. product numbers, trademarks, country of origin, to be imparted to back surface 13 of the belt. This transfer label typically is a relatively thin film of Mylar or other plastic material bearing heat or pressure sensitive ink printing which during vulcanization is transferred from the Mylar backing to the outer surface 13 of the belt. As the belt is built inverted, the next layer applied on the drum is the seamless tube 30 of knit textile material 13 of FIG. 8, which is expanded and elastically stretched sock-like over the mandrel 31 and grips, without wrinkles, against the outer surface of drum 31 with interposed transfer label 51. In this fashion, the wales 35 run longitudinally of the drum, i.e. parallel to its axis. Although it has been found satisfactory to employ a single tubular knit layer 30, obviously depending on the application, two or more layers could advantageously be used, with any intervening rubber layer applied as dictated by the application.

Over the seamless tubular knit 15 is wrapped one or more layers of elastomer such as adhesion gum rubber 17. Preferably the ends of the layer(s) are butt spliced to avoid a lap which might otherwise be reflected as a protrusion or bump in the exterior surface 13 of the belt. This gum layer 17 may alternatively be fiber loaded with any suitable reinforcement fiber such as cotton, polyester or aramid, or may itself include one or more textile reinforcing layers embedded therein. Onto gum layer 17 is applied, by helically winding, strain-resisting tensile cord 20 in typical fashion. The tensile cord may be closely or widely spaced, as needed, and an appropriate amount of winding tension is used, with the ends 20a secured, as shown. Lastly, layer 24 which will serve as the undercord of the belt, is wrapped over the helically wound cord 20. This material may be gum stock, or include discrete fiber loading 29 to enhance the modulus of the ribs 23, 25, 27, 29.

Once the sleeve has been built up on drum 31, the assembly may be placed inside a vulcanizing bag with steam pressure introduced to press the bag radially inwardly against the outer surface of the sleeve (against layer 24), consolidating and vulcanizing the sleeve in customary manner. The mold may then be disassembled and the sleeve demolded. The sleeve may then be placed on a grinding drum and the profile of ribs 23, 25, 27, 29 formed with complimentary shaped grinding wheels or flycutters, removing undercord material between the ribs, and up to apices 26. Alternatively, the ribbed profile may be formed by using a matrix airbag during vulcanization on drum 31, where the shape of the airbag is impressed into the overcord section 24. Alternatively, an airbag can be placed over mandrel 24 and the sleeve pressed outwardly during vulcanization against a rigid outer shell member having the conjugate shape of ribs 23, 25, 27, 29 formed in the shell. Various methods of manufacture will be appreciated by those having skill in this art.

Figure 7:
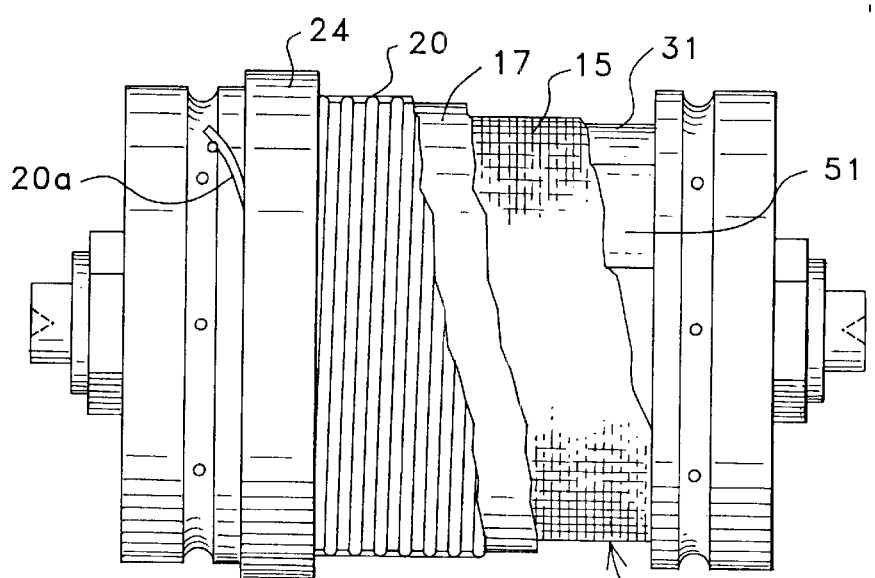
FIG. 7 depicts a partial cut-away of a belt building drum (mandrel) showing the different layered components assembled on the drum to construct a belt sleeve in accordance with the invention.

Although the foregoing process has been described in relation to the manufacture of a multi-V-ribbed belt, it will also be appreciated by those skilled in the art that the synchronous belt of FIG. 6 can also be formed on an appropriate apparatus similar to FIG. 7. For instance, to form the belt of FIG. 6. the mandrel or drum 31 will typically have longitudinally extending teeth on its surface which form belt teeth 50. In this manner, the belt will be built upright rather than inverted. The radially outermost layer to be applied will be the seamless tubular knit textile material 15 in the form of tube 30 which has been radially stretched or expanded, as shown in phantom in FIG. 8 to apply over the partially formed belt sleeve. In that case, an outer airbag will be used to press the rubber/composite materials radially inwardly against the toothed mold mandrel 31.

With similar modifications the belt of FIG. 2 could also be built upright, rather than inverted. In that case the outermost layer is preferably the seamless knit tube, less preferably with a further exterior layer of gum rubber thereover, butt spliced to avoid laps.

Figure 10:
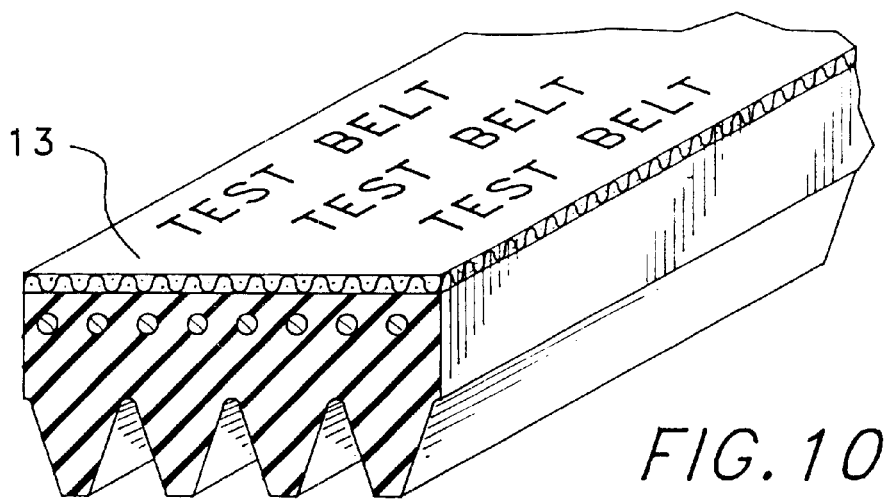
FIG. 10 shows a multi-V-ribbed belt in partial section and perspective with a label applied to its exterior back surface.

Whether producing the belt of FIG. 2 or FIG. 6. by using the outer seamless tubular knit material 15 in accordance with the invention, the standard transfer label 51 may be employed without producing any, or any significant, discontinuities on the outer surface 13 of the belt which would otherwise serve as noise generators when impacting backside idlers or tensioner or other pulleys. That is, when the tubular knit material is positioned at the exterior belt surface 13 as shown in FIG. 9, with the outermost yarn fibers 36, 38, 40 being free from full encapsulation by the rubber matrix, when the transfer label 51 is pressed against the outer surface 13 during vulcanization, as shown in FIG. 10, the printed material is transferred to the back of the belt without substantially affecting its flat, generally planer outer surface. This has unexpectedly been found to be the case even after removal of the Mylar printing strip. Thus, there are no ridges or discontinuities or steps impressed into the outer surface 13. This is in contrast with prior art belts shown in FIG. 11 using a calendared (frictioned) Bannered fabric 53, having an outer thin rubber layer 55 at the exterior surface 13' of the belt. In the case of the prior art belt, when the Mylar transfer label 51 is vulcanized into the outer surface of the belt, it presses against the rubber layer 55, causing it to compress and exude out the edges when the rubber is softened due to heat and pressure. When the Mylar strip is removed from the finished belt ridges or depressions 57 are left behind on the exterior belt surface 13'. These ridges 57, which typically are at least about 0.0015 inches (0.04 mm) higher than the depressed printed portion of the belt, create noise when impinging against idler and tensioner pulleys. In contrast, in practice the height of the step formed by removal of the Mylar transparency in accordance with the subject invention is insubstantial (typically about 0.0008 inches (0.02 mm)) insofar as noise generation is concerned.

EXAMPLES

Figure 11:
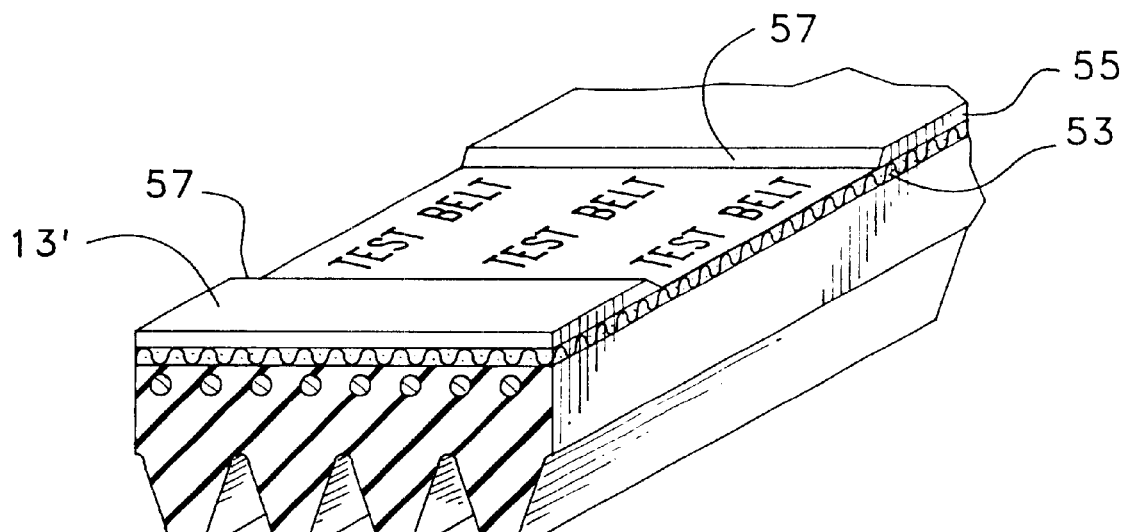
FIG. 11 is a view similar to FIG. 10 illustrating a prior art belt with a label applied to its exterior back surface.

Belts made in accordance with the invention of FIG. 2 and the method described with regard to FIG. 7 generally ran quieter than the prior art belts of FIG. 11 on the test drive of FIG. 1, as measured by sensor 18. The prior art belts exhibited a noticeable thumping noise; the belts of the invention did not. The belts of the invention also generally experienced less weight loss compared to FIG. 11 belts using calendared "Flex-weave" fabric (120° included angle, bias, Bannered fabric—registered trademark) or tire cord, as overcord reinforcement 53.

[1]Belts were built inverted, using Nordel 1145 EPDM for the rubber body, per U.S. Pat. No. 5,610,217, one ply of 0.018 inch (0.457 mm) jersey cotton tube stretched to a diameter approximately 150% the rest diameter of the tube, having outermost fibers unencapsulated by rubber, one ply of 0.012 inch gauge (0.305 mm) adhesion gum, 0.037 inch gauge (0.940 mm) RFL treated S and Z twist polyester cord tensile member, and five plies of 0.028 inch thick each (0.711 mm) fiber load stock (25 parts cotton plus aramid fibers per 100 parts Nordel 1145 EPDM). The total cured thickness of the sleeve was about 0.192 inches (4.88 mm) and the belt length was about 48 inches (122 cm).

A comparison was also made between the belt of FIG. 2 of the invention (using a 0.012 inch thick (0.305 mm) adhesion gum layer 17), and the same belt without layer 17. The belt of the invention with gum layer 17 had a measured fabric to stock adhesion of 2.8 N/mm compared to 0.9 N/mm for the belt omitting layer 17.

The belt and method of the invention offer a number of benefits. There is a complete elimination of overcord fabric splices, thereby providing the most robust manufacturing process possible to assure the elimination of all lapped or splice caused noise. The knitted tubes of the invention offer 100% and more of stretch capability for the building process, limiting the number of knit tube sizes required to cover the product length ranges encountered, thereby limiting the number of different tube sizes required. Textile surfaces on the overcord offer certain coefficient of friction engineerability accomplished by controlling the amount of gum rubber strikethrough. Furthermore, Bannering, calendaring and jacket preparation are eliminated.

Although the present invention has been described in detail in the foregoing for the purpose of illustration, it is to be understood that such detail is solely for that purpose and that variations can be made therein by one skilled in the art without departing from the spirit or scope of the present invention except as it may be limited by the claims. The invention illustratively disclosed herein may be suitably practiced in the absence of any element which is not specifically disclosed herein.

What is claimed is:

1. A power transmission belt comprising a rubber body, a strain-resisting tensile member embedded in the body, an overcord section terminating in a generally flat exterior belt back surface, and an undercord section, the improvement comprising a seamless tubular radially stretchable textile material positioned at the exterior belt back surface; and a rubber layer adhered to the tubular textile material on its under-surface and interposed between the tubular textile material and the strain-resisting tensile member; and wherein the tubular textile material is a seamless tubular knit material formed of yarns, fibers of which positioned at the exterior belt back surface are free from full encapsulation in the rubber body.

2. A power transmission belt comprising a rubber body, a strain-resisting tensile member embedded in the body, an overcord section terminating in a generally flat exterior belt back surface, and an undercord section, the improvement comprising a seamless tubular radially stretchable textile material positioned at the exterior belt back surface; a rubber layer adhered to the tubular textile material on its under-surface and interposed between the tubular textile material and the strain-resisting tensile member; and the power transmission belt having on its exterior belt back surface a transfer label imprinted thereon from a printing strip which has been removed from such belt back surface following transfer of the label thereto, without producing ridges or steps in such surface which exceed about 0.0008 inches in height that could serve as noise generators during running of the belt against a device contacting such surface.

3. A power transmission belt comprising a rubber body, a strain-resisting tensile member embedded in the body, an overcord section terminating in a generally flat exterior belt back surface, and an undercord section, the improvement comprising a seamless tubular radially stretchable textile material positioned at the exterior belt back surface; a rubber layer adhered to the tubular textile material on its under-surface and interposed between the tubular textile material and the strain-resisting tensile member; and wherein the seamless tubular radially stretchable textile material is fully encapsulated in rubber material; and wherein the encapsulating rubber material is in the form of a layer formed over the textile material having a thickness from 0.002 inches to 0.020 inches.

4. A power transmission belt comprising;
a rubber body;
a strain-resisting tensile member embedded in the body;
an overcord section terminating in a generally flat exterior belt back surface;
an undercord section;
a tubular radially stretchable textile material positioned at the exterior belt back surface and formed of yarns, fibers of which positioned at the exterior belt back surface are free from full encapsulation in the rubber body; and
a rubber layer adhered to the tubular textile material on its under-surface and interposed between the tubular textile material and the strain-resisting tensile member;
said tubular radially stretchable textile material together with the belt back surface being so configured that the belt back surface is free of laps, bumps or other discontinuities of a magnitude whereby, upon running of the belt and impingement of such back surface against a pulley or tensioner, noise generation is minimized.

* * * * *